No. 625,570. Patented May 23, 1899.
E. KRONKE.
ROLL HOLDING CAMERA.
(Application filed Oct. 1, 1897.)
(No Model.)
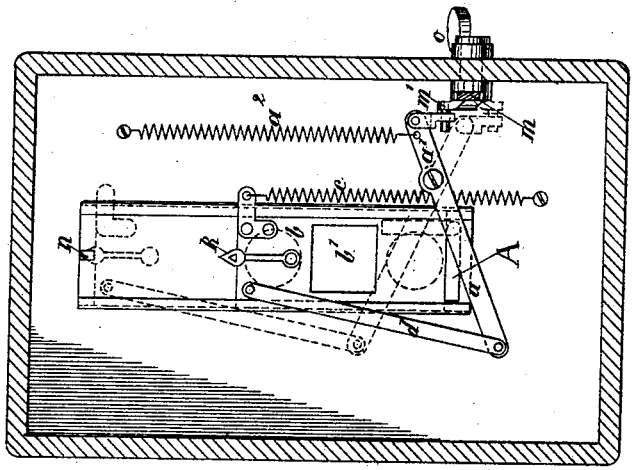
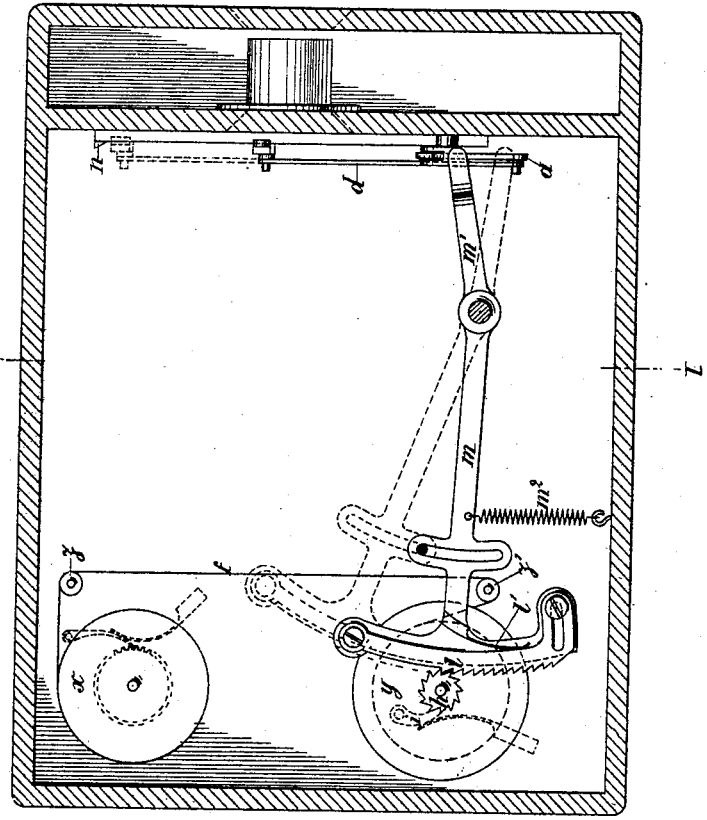

UNITED STATES PATENT OFFICE.

EMIL KRONKE, OF DRESDEN, GERMANY.

ROLL-HOLDING CAMERA.

SPECIFICATION forming part of Letters Patent No. 625,570, dated May 23, 1899.

Application filed October 1, 1897. Serial No. 653,707. (No model.)

*To all whom it may concern:*

Be it known that I, EMIL KRONKE, pianist, a subject of the King of Saxony, residing at No. 1 Lindenplatz, Dresden, in the Kingdom of Saxony and Empire of Germany, have invented new and useful Mechanism for Hand-Cameras for Producing Pictures in Series, of which the following is a specification.

This invention relates to photographic hand-cameras, and has for its object to produce pictures in series—that is to say, pictures successively taken in the smallest possible intervals of time. In order to obtain this object, it is necessary that all the operations required for taking a picture should be effected in one camera in the shortest possible time. These operations consist in raising the shutter, releasing it for an exposure, and changing the sensitive surfaces. All these operations are in the arrangement herein set forth effected by a single pressure of the finger. This distinguishes this invention from others of a similar character having the same object in view. In those some additional manipulation was always required from the operator. In the apparatus covered by the United States Patent No. 528,176, granted to Maroniez October 30, 1894, for instance, the spring-barrel $c$, serving to actuate the shutter B, must be separately wound up by means of a key $d$, the motive power so furnished, however, sufficing for a number of pictures. Yet such an apparatus is evidently less perfect than one fitted with the arrangements of the present application. It has, furthermore, to be borne in mind that the power exerted by a spring decreases as the operation goes on, so that the rapidity with which the shutter moves gradually decreases and the duration of the exposure gradually increases. Moreover, such an arrangement does not preclude the possibility of the operator forgetting to wind up the spring, and so the shutter will either not act at all or not sufficiently. The present invention is entirely free from such defects.

Said invention is shown in the accompanying drawings as applied to a hand-camera in which the sensitive surface is in the form of a film.

Figure 1 shows the camera with the side removed. Fig. 2 is a section on line 1 1, Fig. 1. All moving parts are shown in full lines in their position of rest, dotted lines indicating their position at the extreme end of their movement.

The shutter is placed on the inner side of that wall of the apparatus to which the lens is attached and is constructed as follows: Two slides $b$ and $b'$ are capable of vertical motion. The upper slide $b$, constituting the exposing-shutter proper, has a rectangular aperture, and when in its position of rest this rectangular aperture is not coincident with either the aperture of the lens (shown dotted in Fig. 2) nor with the aperture in the lower auxiliary shutter $b'$, the latter aperture being indicated in Fig. 2 by dotted lines at the lower part of the slide, said auxiliary shutter constituting a screen to cut off light when the exposing-aperture of the shutter $b$ passes the lens during its upward or "setting" movement. When the slides are in their position of rest, the lens-aperture is covered by both the slides $b$ and $b'$, and the slides mutually cover the aperture in each of them. On the shutter is provided a spring lock, bolt, or catch $k$, engaging with the edge of the screen $b'$, so that when this is raised it will carry with it the shutter $b$ by means of said bolt or catch $k$. A spring $c$ engages with the shutter $b$, maintaining the same in its position of rest and bringing it back to its former position when pulled upward. A two-armed lever $a$ $a'$ serves to operate the slides $b$ $b'$, one arm $a$ of said lever being connected by a rod $d$ with the screen $b'$. The other arm $a'$ is acted upon by a spring $a^2$, so as to be retained in its position of rest by said spring or brought back thereto. In order to operate the shutter arrangement, the lever $a$ $a'$ is carried from the position shown in full lines to that shown in dotted lines. By this the spring $a^2$ is put under tension by the arm $a'$, and, on the other hand, the arm $a$ by rod $d$ pushes up the screen $b'$ and with it the shutter $b$, suspended on the former by the catch $k$. Shutter $b$ puts tension on the spring $c$. When the slides $b$ $b'$ approach their topmost position, the point of the catch $k$ meets a nose or shoulder $n$ on the wall of the camera, which shoulder is beveled downward, this pushing the catch off the screen $b'$, so that the connection between the two slides ceases. When these attain their highest position, then the aperture in the shutter $b$ is above the aperture in the lens, the aperture in the screen $b'$ coinciding with that in the lens, and both the last named are covered by the shutter $b$. The moment the catch $k$ is raised and shutter $b$ thus released from screen $b'$ the former is brought back to its original position by the spring $c$, its aperture passing over the uncovered aperture of the lens, thus effecting an exposure. If the power operating the lever $a\ a'$ ceases, the tension of spring $a^2$ becomes operative and returns the lever $a\ a'$ to its position of rest.

The following arrangement serves to change the sensitive surfaces: The film $f$ is rolled up on a roller $x$ and runs off the same over two guide-rollers $z\ z'$, which determine the focal adjustment of the film $f\ f$, and thence passes to the film-winding roller $y$, upon which the exposed portions of the film are wound up. On the spindle of the roller $y$ is provided a ratchet-wheel $h$, with which engage, on the one hand, a pawl $i$, preventing its backward movement, and, on the other hand, a toothed rack $l$. The latter is so mounted on the arm $m$ of a two-armed lever as to be capable of pendulous motion on its upper end. A spring $l'$ tends to maintain contact between the rack $l$ and the segment $h$. On the lever $m\ m'$ acts a spring $m^2$, so as to maintain it in its position of rest. On the fulcrum of the lever $m\ m'$, outside of the apparatus, a single lever $o$ is so mounted as to serve for the finger of the operator to work upon. If the lever $o$ is depressed, the lever $m\ m'$ passes into the position shown in dotted lines, and the segment $l$ operates the ratchet-wheel $h$, and thereby the roller $y$, so as to wind up the film $f$. The dimensions of the segment are so chosen that the length of film that is unrolled equals the height of one picture, and thus the portion of the film stretched between the exposure-rollers $z\ z'$ is after exposure replaced by an unexposed portion when the film is rolled up, thereby changing the surface for exposure. When the pressure upon the lever ceases, the spring $m^2$, placed under tension when the lever was depressed, returns the lever $m\ m'$ to its position of rest. When this takes place, the arm $m$, by reason of its capability of pendulous motion on the lever $m$ and the corresponding inclination of its teeth, passes over the teeth of the ratchet-wheel $h$ without rotating the latter. The lever-arm $m'$ is coupled with the arm $a'$ of the lever $a\ a'$ by a link, so that the motion of the lever $m\ m'$ causes motion of the lever $a\ a'$ also. When by pressure of the finger on the lever $o$ the levers $m\ m'$ and $a\ a'$ are actuated, the segment $l$ and ratchet-wheel $h$ cause the change of film by the roller $y$, and at the same time, by means of the connecting-rod $d$, the slides $b\ b'$ are raised and the spring $c$, (causing the return motion of the slide $b$,) as well as spring $a^2$, similarly acting on lever $a\ a'$ and screen $b'$, are put under tension. It will thus be seen that with the avoidance of all other manipulations a simple pressure of the finger on lever $o$ causes all those operations in the camera which are required for the production of a picture and that in proper sequence.

By means of a camera fitted with the said invention not only such pictures can be produced which, like series pictures, require instantaneous exposure, but those requiring time exposure also, if an arm A, capable of rotation, is so mounted at the shutter as to be enabled to support the slides. If this arm is placed in the position shown by dotted lines in Fig. 2 after the slides have been raised, it will stop the shutter $b$ at the moment of its return motion, in which its aperture coincides with that of the lens, so that time exposure results.

What I claim, and desire to secure by Letters Patent of the United States, is—

1. In a hand-camera for film-photography an arrangement for producing by one single movement of the finger all the operations required for producing a picture, which arrangement is characterized by the following features, in combination, namely, the lever $o$, on the outside of the camera, the lever $m$, $m'$, fixed on the same spindle as said lever $o$, but within the camera, a lever $a$, $a'$, coupled with the arm $m'$, of said lever $m$, $m'$, a toothed segment on said arm $m$, a ratchet-wheel $h$, the film-winding roller $y$, carrying said ratchet-wheel, the screen $b'$, connecting-rod $d$, between lever $a$, $a'$, and said screen, a shutter $b$, suspended on said screen by a catch $k$, and the restoring-springs $m^2$, $a^2$, and $c$, substantially as set forth.

2. The film-winding roller, the shutter, and screen, in combination with connected mechanisms for moving the shutter backward, for moving the screen to intercept the light, and to bring the film-winding-roller-operating mechanism into operative position, and means moving said film-winding-roller-operating mechanism to turn said roller, means for restoring said screen, and independent means for moving said shutter forward through its picture-taking movement, substantially as set forth.

In testimony whereof I have hereunto set my hand in the presence of two witnesses.

EMIL KRONKE.

Witnesses:
HERNANDO DE SOTO,
PAUL ARRAS.